United States Patent [19]
Kelly et al.

[11] Patent Number: 6,012,925
[45] Date of Patent: Jan. 11, 2000

[54] METHOD FOR GUARANTEEING REMUNERATION RECEIVED BY THE OWNER WHEN SELLING CATTLE

[76] Inventors: James B. Kelly; John Farmer, both of 3400 Bissonnet, Suite 200, Houston, Tex. 77005; Mike Warren, 10094 Placide Rd., Maurice, La. 70555; James R. Hartman, 308 Woodway, Victoria, Tex. 77904

[21] Appl. No.: 08/976,920

[22] Filed: Nov. 24, 1997

Related U.S. Application Data

[63] Continuation of application No. 08/677,127, Jul. 9, 1996, abandoned.

[51] Int. Cl.[7] .................................................. G09B 19/18
[52] U.S. Cl. ............................................................ 434/107
[58] Field of Search ............................................. 434/107

[56] References Cited

PUBLICATIONS

In re Schrader (CA FC) —30 USPQ 2d 1754, pp. 1–9, Aug. 1994.
Sate Street Bank and Trust Co. vs. Signature Financial Group Inc. (DC Mass) —38 USPQ 2d 1530, pp. 1–2, Mar. 1996.
E Parte Murray, 9 USPQ2d 1819 (BdPatApp&Int), pp. 1–7, Dec. 1988.
Simone et al., "Canada's GRIP program: a boon for Canada's wheat producers?", Situation and Outlook Report. Wheat, n293, p24(8), May 1991.

*Primary Examiner*—Robert A. Hafer
*Assistant Examiner*—Laura Fossum
*Attorney, Agent, or Firm*—Gunn & Associates P.C.

[57] ABSTRACT

This invention is directed toward a method of doing business, wherein a first entity, referred to as the Secondary Guarantor, engages in the business of providing and evaluating financial guarantees by way of a joint venture or other arrangement with a second entity, hereafter referred to as the Primary Guarantor, authorized by the appropriate authorities to engage in the writing of financial guarantees. These entities combine to form the "guarantor" or the "company". The guarantee is preferably sold by the secondary guarantor entity to an owner of a product or commodity, and guarantees that the owner will obtain a remuneration subsidy or "settlement" for the product or commodity at the time of sale, should the sale price be below the cost to produce the product or commodity. The invention is more particularly directed to guaranteeing the owner of cattle, or more specifically the "feeder" of cattle, an established remuneration subsidy at the time of the sale of the cattle at a price below the cost to produce the marketed cattle.

18 Claims, 3 Drawing Sheets

METHOD FOR GUARANTEEING REMUNERATION RECEIVED BY THE OWNER WHEN SELLING CATTLE

This application is a continuation of application Ser. No. 08/677,127 filed Jul. 9, 1996 now abandoned.

BACKGROUND OF THE INVENTION

1. Field of the Invention

This invention is directed toward a method of financial guarantees, wherein a first entity, hereafter referred to as the Secondary Guarantor, engages in the business of providing and evaluating financial guarantees by way of a joint venture or other arrangement with a second entity, hereafter referred to as the Primary Guarantor, authorized by the appropriate authorities to engage in the writing of financial guarantees. These entities combine to form the "Guarantor". The guarantee is preferably sold by the Secondary Guarantor to an owner of a product or commodity, and guarantees that the owner will obtain a remuneration subsidy or "settlement" for the product or commodity at the time of sale, should the sale price be below the cost to produce the product or commodity. The invention is more particularly directed to guaranteeing the owner of cattle an established remuneration subsidy at the time of the sale of the cattle at a price below the cost to produce the marketed cattle.

2. Background of the Invention

The sale of any product or commodity by the owner of the product or commodity results in financial risk as well as potential financial rewards. The risks, and the potential rewards, are both usually enhanced if the selling owner is also the producer of the product or commodity being sold. The seller is often willing to sacrifice some of the reward, namely potential profit, for a reduction in financial risk, namely reduction in the likelihood of financial loss.

Attention will first be directed toward a brief discussion of the financial principles in the production and sale of a commodity such as beef cattle, although the general principles are also applicable to the production and sale of other items, such as articles of manufacture and the like.

The owner of cattle, hereafter referred to as a "feeder", often employs the service of a feedyard to fatten cattle prior to sale. Presently, approximately 22 million head of cattle are fattened in feedyards in the United States, and 5 to 6 million head are fattened in the state of Texas. Cattle usually enter the feedyard at a weight of approximately 600 to 800 pounds per head. After a perhaps 150 day period of feeding, the weight of each head of cattle increases to a weight in the range of 1,100 to 1,300 pounds, at which time the cattle are sold. The selling weight is usually referred to as the "weighed up fat FOB feed yard" weight, but will be simply referred to as the "sell" weight for brevity in this disclosure.

Extensive data concerning the fattening of cattle in feedyards was compiled from 1975 through 1995. This data indicates that, over the past 21 years, if a loss is incurred at the sale of the cattle, then the loss is statistically 15% or less of the cost to purchase and fatten the cattle to the time of sale. Stated another way, the sell price of cattle is rarely less than 85% of the "break even" selling price projected at the beginning of the fattening period. This price variation can be due to variation in demand at the time of selling, as well as other factors such as changes in the cost of feed during fattening, and the cost of processing and shipping at the time of sale. It should be noted that the time period over which past data was studied is sufficiently long to encompass expected periodic variations in cost to produce and sale price. Conclusions drawn from the analysis of this data set is, therefore, statistically significant. Obviously, the rancher strives to make a profit on the sale of a group or "pen" of fattened cattle. Statistically, however, the feeder can lose as much as 15% of the funds invested in the purchase and fattening of the cattle. Losses greater than 15% of the forecasted break even price are possible, but rare.

In many instances, the feeder is willing, at the time the pen of cattle enters the feedyard for fattening, to forfeit some potential profit in order to guarantee against a reasonable limit of potential loss. As an example, a feeder might be willing to forfeit one third of the potential profit on a pen of cattle, for a guarantee of subsidy of any loss up to 15% of the break even sell price. Using the previously mentioned "actuarial" break even pricing data from 1975 through 1995, such an arrangement would, at least statistically, greatly reduce the feeder's risk to any loss, but at the cost of reducing the maximum potential profit.

An objective of the present invention is to provide a method to reduce the risk of financial loss of a seller of a commodity or product by means of a guaranteed subsidy or settlement which is purchased by the seller at a specified time interval prior to the sale of the commodity or product, and is paid to the seller by the guarantor in the event that the product or commodity is sold below a break even cost. In the case of cattle, the guarantee is typically sold to the feeder within five days of the time at which the cattle are placed in the feedyard.

An additional objective of the invention is to provide a method of escrowing subsidy funds through a Primary Guarantor and a Secondary Guarantor, for payment to the seller in the event of a financial loss at the time of sale of the product or commodity.

A further object of the invention is to providing a method for determining the amount of fees, paid by the seller to the guarantor, in return for the guaranteed subsidy payable by the guarantor in the event of a financial loss to the seller at the time of sale.

A still further objective of the invention is to provide a method for transferring fee income paid by the seller and securities provided by the Secondary Guarantor to cover potential settlements which might exceed fee income, into an escrow account, which is preferably held by the Primary Guarantor which is a financial institution such as a bank. The method also includes procedures for transferring subsidy funds paid by to the seller to a second financial institution, whereby the seller can draw a subsidy or settlement in the event the product or commodity is sold at a financial loss.

A further objective of the invention is to provide a method for the seller to file a claim, through the Secondary Guarantor, in the event of a financial loss, whereby the Secondary Guarantor then makes the payment of a subsidy settlement to the client through the second financial institution.

An even further objective of the invention is to provide a method for subsidizing a cattle feeder against a loss incurred at the time of the sale of a pen of cattle, where the amount of the subsidy is based upon a percentage of an actuarially determined break even sale price for the pen of cattle.

There are additional objectives of the invention which will become apparent in the following disclosure.

BRIEF SUMMARY OF THE INVENTION

This invention is directed toward a method of doing business, wherein a first entity, hereafter referred to as the Secondary Guarantor, engages in the business of providing and evaluating financial guarantees by way of a joint venture or other arrangement with a second entity, hereafter referred to as the Primary Guarantor, authorized by the appropriate authorities to engage in the writing or issuing of financial guarantees. A bank is an example of a Primary Guarantor. The guarantee is preferably sold by the Secondary Guarantor to an owner, and preferably the producer, of a product or commodity. The seller of the product or commodity is referred to as the "client" or "customer" or other terms, depending upon the product or commodity. This method guarantees that the seller will obtain a remuneration subsidy or "settlement" for the product or commodity at the time of sale, should the sale price be below the cost to produce the product or commodity.

For purposes of discussion, it will be assumed that the invention is embodied as a product which guarantees the producer and owner of beef cattle, hereafter referred to as the "client" or the "feeder", an established remuneration subsidy at the time of the sale of the cattle at a price below the cost to produce the marketed cattle. It should be understood, however, that the methods of the invention are equally applicable to other business activities.

As a first step, the Secondary Guarantor enters into an agreement with a Primary Guarantor, for various considerations to the Primary Guarantor, that the Secondary Guarantor shall act as an agent for the Primary Guarantor in authorizing the writing of financial guarantees. As an example, the Primary Guarantor is a bank which is authorized to issue financial guarantees under federal and state regulations, and the Secondary Guarantor acts as an agent to evaluate and formulate the financial guarantees. Using the example under discussion, the feeder pays a fee to the Secondary Guarantor for guarantees that if a particular pen of cattle sells below the break even cost, then the feeder will be paid, through the Primary Guarantor with approval of the Secondary Guarantor, a settlement up to a specified percentage of the break even price to cover the financial loss.

As a second step, the Secondary Guarantor then furnishes the Primary Guarantor with securities in the form of cash, bonds, letters of credit, insurance policies, and other negotiable instruments satisfactory to the Primary Guarantor which shall constitute unencumbered security to the Primary Guarantor for meeting claims under the guarantees issued by the Primary Guarantor within the terms of the previously mentioned agreement between the Primbry Guarantor and the Secondary Guarantor. Stated another way, the funds are provided by the Secondary Guarantor, and the Secondary Guarantor is at risk in the event that a claim is filed against the issued guarantee, even though the claim is paid under the auspices of the authorized Primary Guarantor.

The third step in the methodology of the invention involves the "client" requiring financial guarantees against products, commodities, real estate, and the like. The client could also require guarantees against the performance of services, or upon operation of plant and machinery, and the like. The Secondary Guarantor is knowledgeable in the area or field in which the guarantee is being issue, and thereby preferably establishes specific terms of the guarantee such as the maximum amount of settlement that could be paid and the amount of fee charged the client for the guarantee. These specific terms are usually derived by the Secondary Guarantor by studying past financial data in the area or field, where the time period represented by the data set is considered statistically significant in that it includes periodic economic cycles. Using the example being discussed, the client is, of course, the feeder requiring guarantees against the sale of cattle at a price below break even. The feeder applies preferably to the Secondary Guarantor for the guarantees which, in the example, is essentially a bank guarantee or letter of credit. The application is subsequently approved by the Secondary Guarantor subject to the provisions of the agreement between the Primary Guarantor and the Secondary Guarantor discussed previously in the first and second steps. Again using the example, the Secondary Guarantor would preferably be very familiar with the beef cattle business, and would be in a position to knowledgeably evaluated the request for financial guarantee from the feeder, and set actuarially viable claim limits and fees.

As a fourth step, clients who have accepted the terms of the financial guarantee or letter of credit, which have been set by the Secondary Guarantor, shall then pay the required fees to the Primary Guarantor. The Primary Guarantor then credits these fees to an account, hereafter referred to as a Joint Guarantee Fund, which is set aside for the purpose of constituting additional security for the settling of claims against the guarantees. The Primary Guarantor then issues a financial guarantee or letter of credit to the client. If, using the example being discussed, the feeder files a claim for a subsidy under the terms of the agreement, the funds would be paid by the Primary Guarantor, which is a preferably licensed bank. The Primary Guarantor or bank would then be reimbursed from fees provided by the client, by securities provided by the Secondary Guarantor at the second step and, if necessary, from funds residing in the Joint Guarantee Fund.

As a fifth step, treatment of guarantees which have expired, or which have been presented for claims in whole or part, will next be examined. The Secondary Guarantor receives the claims and approves or disapproves based on the terms of the agreement. Using the example, the feeder files claims through the Secondary Guarantor, and the claims are reviewed by the Secondary Guarantor who is familiar with the cattle business and can competently evaluate each claim. When any and all claims due the client are paid to the client by the Primary Guarantor, the Primary Guarantor then accounts to the Secondary Guarantor for any surplus in the Joint Guarantee Fund. This accounting takes into account all potential liabilities against the Joint Guarantee Fund for outstanding guarantees still current, and any fees payable to the Primary Guarantor by the Secondary Guarantor under the terms of the agreement between the Primary Guarantor and the Secondary Guarantor outlined in the first step. Profits of the Secondary Guarantor are drawn from surplus funds in the Joint Guarantee Fund. Profits of the Primary Guarantor are obtained from payments by the Secondary Guarantor to the Primary Guarantor under the terms of the agreement discusses in the first step.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of the invention and are therefore not to be considered limiting of its scope, for the invention may admit to other equally effective embodiments.

DETAILED DESCRIPTION OF THE PREFERRED EMBODIMENTS

Figure 1:
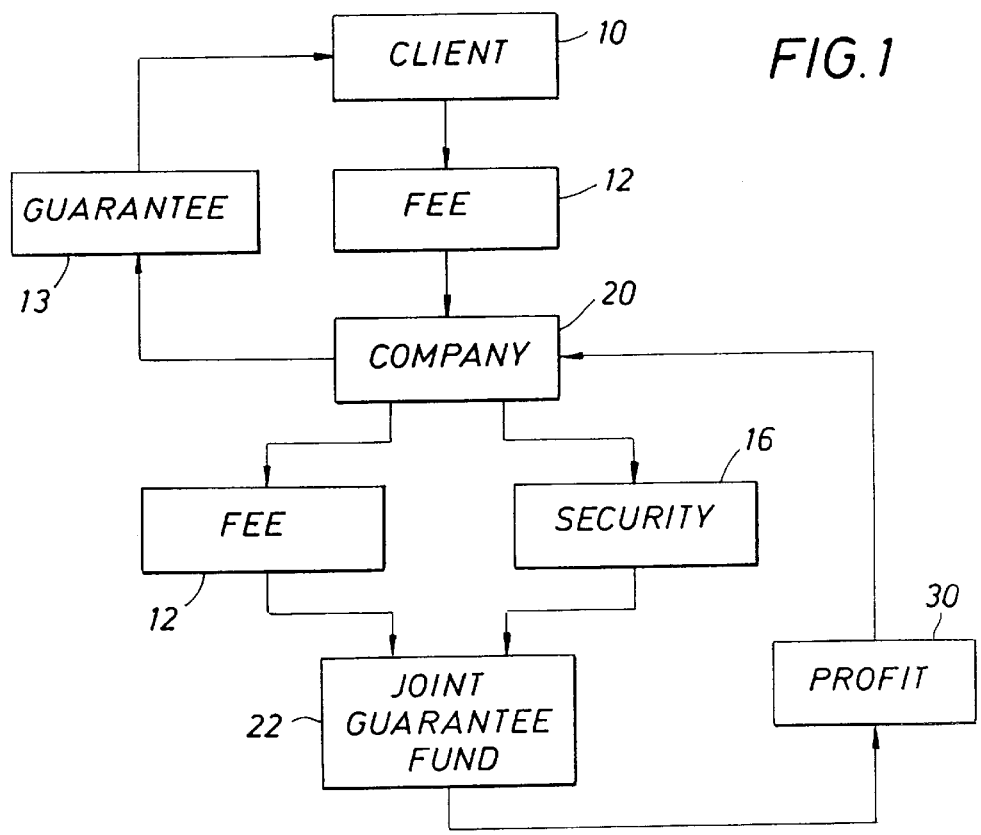
FIG. 1 is a functional diagram of the invention depicting participants, elements and actions in the event that no claim is filed and no settlement is paid to the client.

Attention is first directed to FIG. 1 which illustrates diagramatically the most basic participants, the key elements, and the principal actions involved in practicing the teachings of this disclosure. Recall that the disclosed invention is directed toward a method of doing business, where a Guarantor or "Company" 20, consisting of a Secondary Guarantor cooperating with a Primary Guarantor in a manner previously described, issues a guarantee 13 to a seller of a product or commodity, referred to as the "client" 10, to financially subsidize the client in the event that the sale price is less than the cost to produce the product or commodity. The maximum amount of the subsidy or settlement is preferably established as a percentage of the "break even" cost. The maximum percentage is preferably set by the Company 20 as a result of the analysis of past financial data including production costs and sale prices of the product or commodity over a statistically significant time period. As examples, the maximum subsidy might be established as 15% of the break even cost, where the break even cost is preferably forecast by the client and approved by the Company. If the sale price is 90% of the break even cost, the Company 20 subsidizes the client 10% of the break even cost, thus the client neither makes a profit nor loses money. If the sale price is greater than the break even cost, say 107% of the break even cost, the Company pays the client no subsidy, and the client's profit is 7%. If the sale price is only 80% of the break even cost, the Company pays the client the maximum subsidy of 15% of break even cost. In this scenario, the client still loses 5% on the sale, but the amount is considerably less than the 20% the client would have lost without the guarantee from the Company.

In exchange for the subsidy guarantee 13, which is agreed upon at a predetermined time interval before the sale of the product or commodity, the client 10 pays the Company 20 a fee identified by the numeral 12 in FIG. 1. As an example, the fee can be based upon the break even cost and might be might be 5% of the break even cost. Preferably, the fee 12 is included in the break even cost. If the cost of the fee 12 is not included in the break even cost, this cost will correspondingly reduce the profit and increase the loss in the above examples. As an example, if the sale price is 107% of the break even cost (excluding the 5% fee) the actual profit will be (7% - 5%)=2%.

Still referring to FIG. 1, the Company 20 receives the fee 12 and deposits this fee in a Joint Guarantee Fund 22 in a suitable financial institution such as a bank. As mentioned previously, the Company actually consists of two primary entities, though it is depicted as a single entity 20 in FIG. 1. The Joint Guarantee Fund can be held in the Primary Guarantor entity of the Company if the Primary Guarantor entity is an institution such as a bank. In addition, the Secondary Guarantor entity of the Company provides addition funds in the form of securities 16 to the Joint Guarantee Fund 22 to financially cover the subsidy guarantee. Details of the entities within the Company and their interactions will be discussed in detail in a subsequent section. The provision of additional securities 16 to the Joint Guarantee Fund account 22 will also be discussed further in a subsequent section.

FIG. 1 depicts a scenario wherein the sale price is greater than the break even cost, and no subsidy is paid by the Company 20 to the client 10. There is, therefore, a surplus in the Joint Guarantee Fund 22 resulting from the deposit of the fee 12 and other securities 16. The Company therefore draws a profit 30 from the Joint Guarantee Fund 22.

Figure 2:
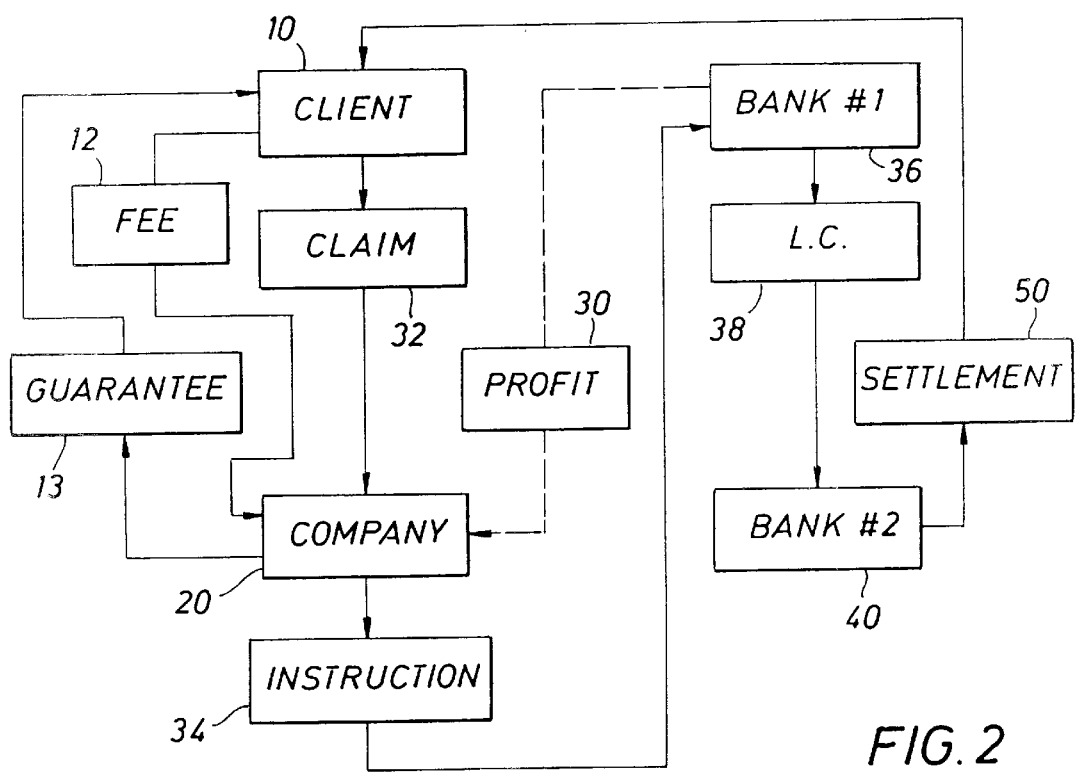
FIG. 2 is a functional diagram depicting participants elements and actions in the event that the client/feeder files a claim and a settlement is paid to the client.

Attention is next directed to FIG. 2 which illustrates diagramatically the primary participants, the key elements, and the principal actions involved in a scenario where the sale price of the product or commodity is less than the break even cost. Other elements, participants and actions, such as bank participation, are also illustrated in FIG. 2 which are applicable to the scenario of FIG. 1 as will become apparent in the following discussion. Once again the Company 20 issues a guarantee 13 to the client 10 in return for the payment of a fee 12.

Still referring to FIG. 2, upon receipt of the fee 12, the Company, by means of instruction 34, instructs a first bank 36 to draw a letter of credit in the amount of the guaranteed maximum subsidy. Although shown as a separate entity in this illustration, the first bank 36 is normally a financial institution with which the Company 20 does business, and is likely the Primary Guarantor entity of the Company and the financial institution which holds the previously discussed Joint Guarantee Fund 22. The first bank 36 then transmits a letter of credit 38, in the amount of the maximum guaranteed subsidy, to a second bank 40 which is normally the principle bank with which the client 10 does business. Since FIG. 2 depicts a scenario in which the sale price is less than the break even cost, the client 10 files a claim 32 with the Company 20. Upon reviewing the claim 32, the Company 20 instructs the second bank 40, which is normally the client's bank, to pay a settlement 50 to the client 10. As discussed previously and illustrated with examples, the settlement 50 may or may not be greater than the amount of the fee 12. If the settlement is less than the fee, then a profit 30 is drawn by the Company 20 from the first bank 36, wherein the profit is preferably drawn from the Joint Guarantee Fund 22.

Figure 3:
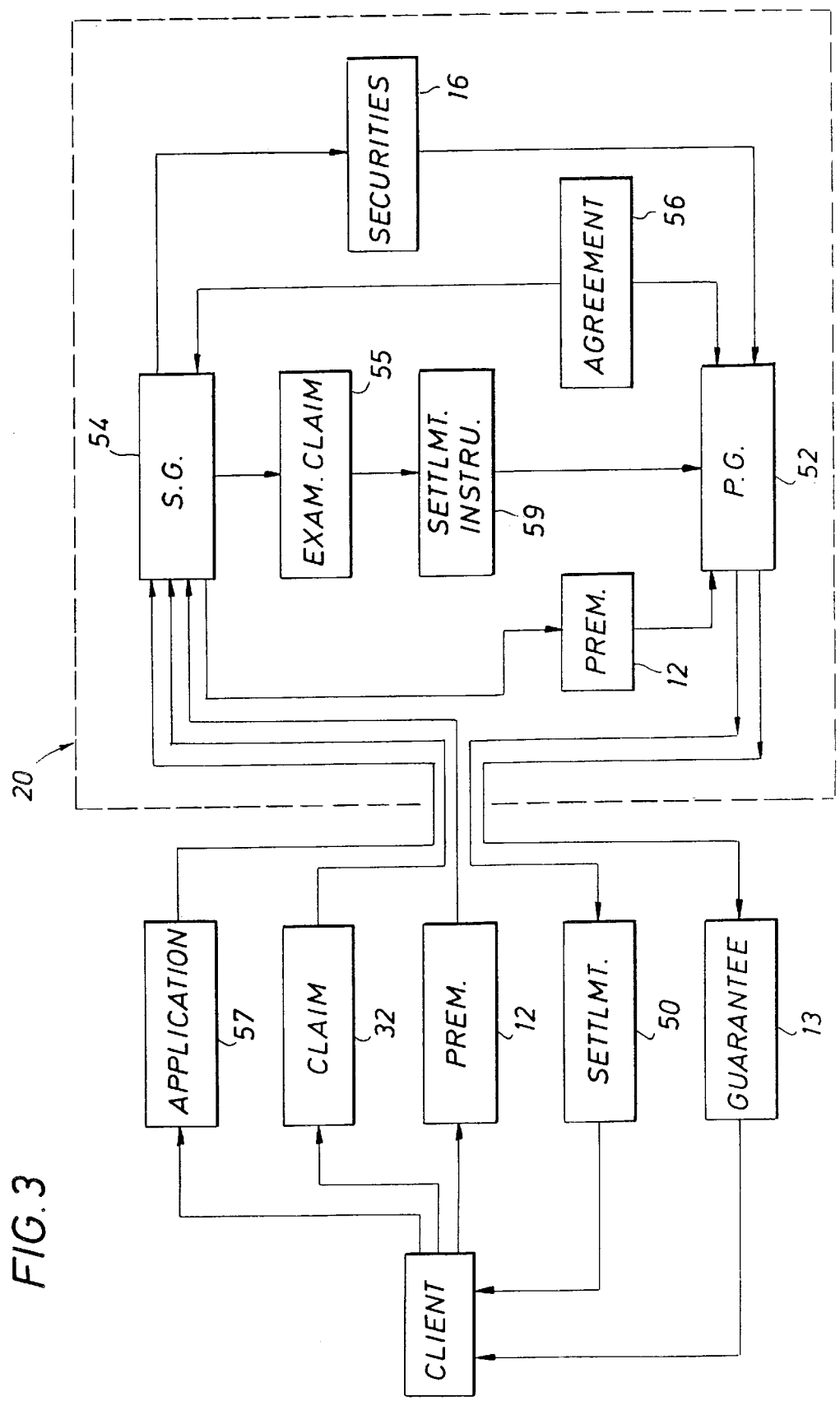
FIG. 3 illustrated in more detail the participants and actions of the entity referred to as the Guarantor, and the Guarantor's interactions with the client.

FIG. 3 illustrates in more detail the functionality of the participants and the actions of the entity referred to, as a whole, as the Company 20, and the Company's interactions with the client 10. As discussed previously. the Company 20 actually consists of a first entity 54, which is the Secondary Guarantor, engaged in the business of providing and evaluating financial guarantees by way of a joint venture or other agreement 56 with a second entity 52 which is the Primary Company, authorized by the appropriate authorities to engage in the issuing of financial guarantees 13. The guarantee 13 is preferably sold by the Secondary Guarantor to the client 10.

Still referring to FIG. 3, the Secondary Guarantor 54 and the Primary Guarantor 52 enter into the agreement 56, for various considerations to the Primary Guarantor, that the Secondary Guarantor shall act as an agent for the Primary Guarantor 52 in authorizing the issuance of financial guarantees 13. As an example, the Primary Guarantor 52 is preferably a bank which is authorized to issue financial guarantees of letters of credit, and the Secondary Guarantor 54 acts as an agent to evaluate the financial guarantees 13 and any resulting claims 32 filed by the client 10. Normally, the Secondary Guarantor provides all funds for the payment of any settlements 50 resulting from claims 32 filed by the client 10. Alternately, the Primary Guarantor 52 can serves as at least a partial source of funds should a claim 32 be filed by the client 10. In this arrangement, the Primary Guarantor 52 would receive in return a portion of the fee 12 paid by the client 10.

Again referring to FIG. 3, the Secondary Guarantor 54 then furnishes the Primary Guarantor 52 with securities 16 in the form of cash, bonds, letters of credit, insurance policies, and other negotiable instruments satisfactory to the Primary Guarantor which shall constitute unencumbered security to the Primary Guarantor for meeting claims under the guarantees 13 issued by the Primary Guarantor within the terms of the agreement 56 between the Primary Guarantor and the Secondary Guarantor. Stated another way, the funds of the Secondary Guarantor 54, and not the funds of the Primary Guarantor 52, are at risk in the event that a claim 32 is filed against the issued guarantee 13, even though the claim is paid under the auspices of the authorized Primary Guarantor 52.

As shown in FIG. 3, the Secondary Guarantor 54 entity of the Company 20 receives an application 57 for the guarantee 13 from the client 10, fee payments 12 from the client and credits these payments to the Joint Guarantee Fund 22 (see FIG. 1) which normally resides within the Primary Guarantor 52. The Primary Guarantor then issues the guarantee 13 to the client 10. If a loss is incurred by the client 10, the client files a claim 32 which is initially received by the Secondary Guarantor 54. The Secondary Guarantor 54 evaluates the claim at 55, either approves or disapproves the claim, and forwards any settlement instructions 57 to the Primary Guarantor concerning payment of a settlement. If so instructed in the claim instruction 57, the Primary Guarantor pays a settlement 50 to the client 10. When any and all settlements 50 due are paid to the client 10 by the Primary Guarantor 52, the Primary Guarantor then accounts to the Secondary Guarantor for any surplus in the Joint Guarantee Fund 22. This accounting takes into account all potential liabilities against the Joint Guarantee Fund for outstanding guarantees still current, and any fees payable to the Primary Guarantor 52 by the Secondary Guarantor 54 under the terms of the agreement 56. Profits of the Secondary Guarantor are drawn from surplus funds in the Joint Guarantee Fund 22. Profits of the Primary Guarantor 52 are obtained from payments by the Secondary Guarantor 54 to the Primary Guarantor under the terms of the agreement 56.

Attention is next directed toward applying the methodology of the invention to guaranteeing a feeder a subsidy should the sale price of a group or "pen" of cattle be below the break even cost of purchasing and fattening the cattle at a feedyard. As mentioned previously, cattle usually enter the feedyard at a weight of in the range of 600 to 800 pounds per head. After perhaps a 150 day period of feeding or some period required to fatten the cattle to a weight in the range of 1,100 to 1,300 pounds per head, the cattle are sold. The selling weight is usually referred to as the "weighed up fat FOB feed yard" weight, but is simply referred to as the "sell" weight for brevity in this disclosure.

As mentioned in a previous section, extensive data concerning the fattening of cattle in feedyards has been compiled for the years 1975 through 1995. This body of data has been analyzed statistically and indicates that, when a financial loss occurs, the selling price of cattle upon reaching the desired sell weight at the feedyard is usually no less than 15% below the break even cost of purchasing and fattening the cattle, where the break even cost forecast is made when the pen of cattle enters the feedyard. Losses can, of course, be greater but such losses are at least statistically rare.

In many instances, the feeder is willing, at the time the pen of cattle enters the feedyard for fattening, to forfeit some potential profit in order to guarantee against a reasonable limit of potential loss. As an example, a feeder might be willing to forfeit one third of the potential profit on a pen of cattle, for a guarantee of subsidy of any loss up to 15% of the break even sell price. Using the previously mentioned "actuarial" break even pricing data from the 1975 through 1995 time period, such an arrangement would, at least statistically, greatly reduce the feeder's risk to any loss, but at the cost of reducing the maximum potential profit. The 21 year time period is considered sufficiently long to include cycles of cattle price fluctuations and production cost fluctuations. The determined 15% figure is, therefore, considered to be statistically significant.

Figure 4:
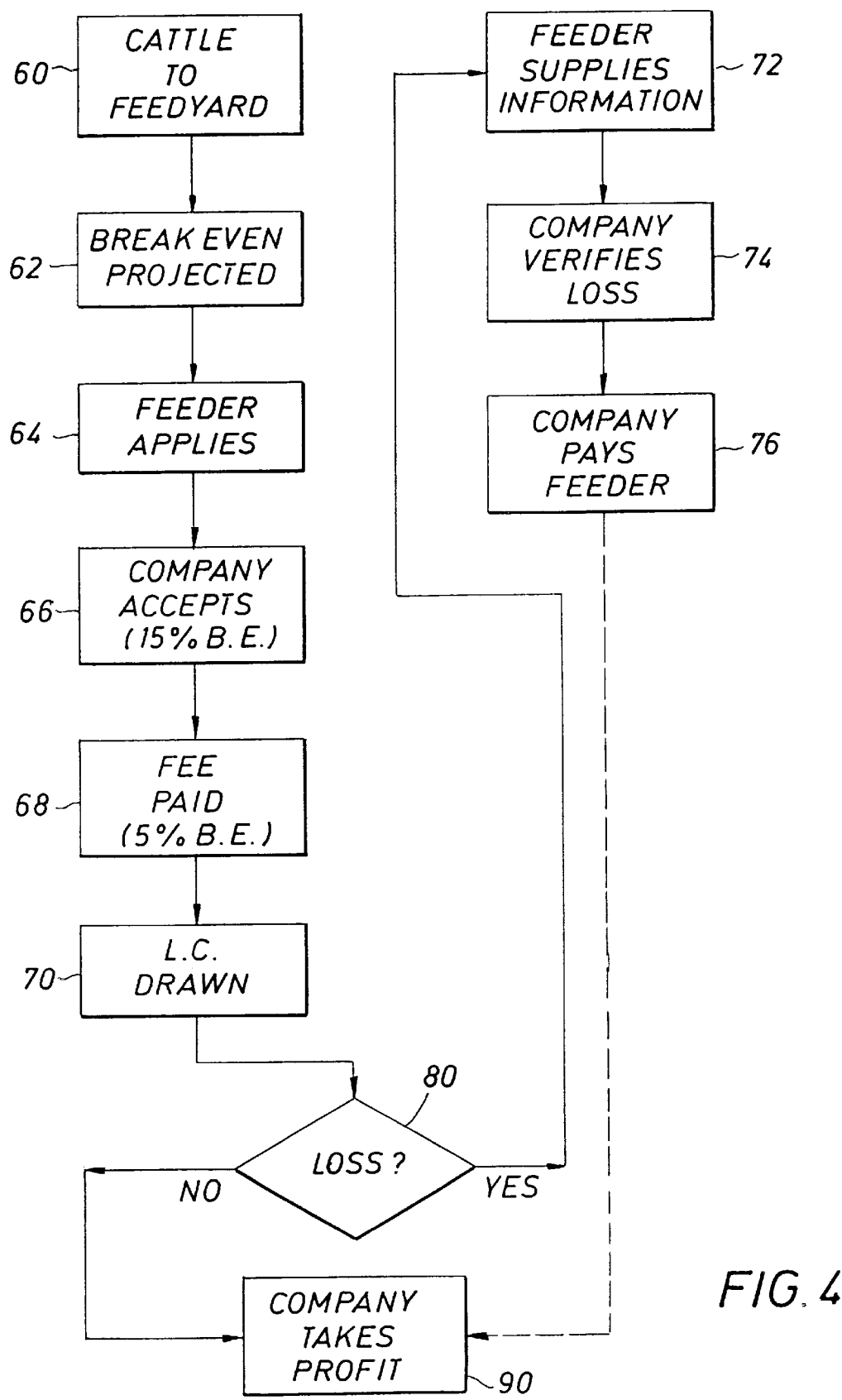
FIG. 4 is a flow chart of the invention embodied to guarantee a subsidy or settlement to a feeder for the sale of cattle if the sale is below the break even cost.

FIG. 4 is a flow chart of the invention embodied to guarantee a subsidy or settlement to a feeder for the sale of cattle if the sale is below the break even cost. A pen of cattle is delivered to a feedyard at step 60. Preferably, the feedyard informs the feeder of the available guarantee. At step 62, a break even cost is forecasted by the feeder. If the feeder chooses to apply, the feedyard preferably gives the feeder an application form to complete, and preferably forwards the completed application by fax or other means to the Company 20 (see FIG. 3) at step 64. At step 66, the Company, and in particular the Secondary Guarantor entity of the Company, evaluates the application, accepts the application and sets the maximum subsidy or settlement. The Secondary Guarantor is very familiar with the risks of cattle business but need not be familiar with the basic mechanics of the issuances of bank guarantees and letters of credit. The Primary Guarantor is preferably a bank and handles these latter tasks, and need not be familiar with the cattle business. This illustrates the necessity of the both Primary and Secondary Guarantor entities which comprise what is referred to as the Company 20. Again for purposes of illustration, the previous example of 15% of projected break even will be used as the maximum settlement payable upon loss at sale. At step 68, the Company, and in particular the Secondary Guarantor, establishes a fee commensurate with the maximum settlement of 15% and with available actuarial data. Using the previously discussed example, the fee is assumed to be 5% of the projected break even cost. The fee can be paid as a lump sum to the Company, or can be paid to the feedyard along with periodic feed payments, wherein the feedyard then forwards the fee to the Company. At step 70, the Company instructs the feeder's bank to draw a letter of credit in the amount of the maximum settlement amount in favor of the client.

Still referring to FIG. 4, different steps are followed depending upon whether the pen of cattle are sold above or below break even cost. The flow chart branches at 80 depending upon sale price. If no loss is incurred, the feeder files no claim, no settlement is paid, and the Company takes a profit at step 90. If a loss is incurred, the feeder supplies detailed information to the Company at step 72 concerning the break even cost of the pen of cattle. The Company, and in particular the Secondary Guarantor entity of the Company, verifies the loss at step 74 and pays the feeder at step 76, preferably by the letter of credit through the Company's bank. If the fees are greater than the settlement, then the Company again takes a profit at step 90.

While the foregoing is directed to the preferred embodiments of the invention, the scope thereof is determined by the claims which follow.

What is claimed is:

1. A method of providing financial guarantees against monetary loss to a seller of products, comprising:

(a) obtaining a probability and magnitude of losses that can be incurred in a sale of said product from a compilation and analysis of past cost required to make and sell the product and sale data from the sale of the product; (b) issuing a guarantee to said seller prior to the sale of said product to pay a settlement to said seller in an event that said seller incurs an actual loss at the sale of said product;

(c) obtaining a value of said settlement from said analysis of data; anc (d) setting the settlement value from said analysis of a fee to be paid for said guarantee prior to the sale of said product by said seller for said guarantee, wherein said settlement is funded solely from a plurality of fees paid by a plurality of sellers; wherein said fee is determined as a percentage of a break even sale price of said product.

2. The method of claim 1 further comprising:

(a) placing said fee into a joint guarantee fund;

(b) placing securities into said joint guarantee fund;

(c) paying said settlement to said seller from funds withdrawn from said joint guarantee fund; and (d) taking a profit from any surplus funds within said joint guarantee fund.

3. The method of claim 2 wherein:

(a) said seller files a claim in the event a loss is incurred at the sale of said product;

(b) said claim is verified; and (c) a financial institution is notified to pay said settlement.

4. A method for providing a financial settlement to a client in an event of financial loss incurred by said client at a sale of a commodity, the method comprising:

(a) forming a company comprising a primary guarantor entity and a secondary guarantor entity;

(b) issuing a guarantee to said client which specifies an amount of a settlement to be paid said client by said company if a loss is incurred by said client at a sale of said commodity;

(c) collecting a fee from said client as a payment for said guarantee; wherein:

(d) said fee is determined as a function of a break even cost of said commodity;

(e) said secondary guarantor obtains from a compilation and an analysis of past sale prices and cost required to make and sell said commodity, wherein said secondary guarantor specifies an amount and a maximum limit of said settlement based upon said analysis, and specifies an amount of said fee based upon said analysis;

(f) said primary guarantor pays said settlement to said client in an event a loss is incurred by said client at the sale of said commodity: and (g) said settlement is solely funded from a plurality of fees paid by a plurality of sellers.

5. The method of claim 4 further comprising the steps of:

(a) collecting of said fee by said secondary guarantor entity;

(b) placing said fee in a joint guaranty account; and (c) placing by said secondary guarantor of additional securities within said joint guarantee account.

6. The method of claim 6 further comprising the steps of:

(a) in the event of a loss, filing a claim by said client with said company;

(b) verifying said claim by said secondary guarantor entity of said company; and (c) notifying said primary guarantor by said secondary guarantor to pay said settlement to said client if said evaluation shows that said client has incurred a loss.

7. The method of claim 6 wherein said settlement is drawn from funds within said joint agreement account.

8. The method of claim 6 wherein said primary guarantor issues a letter of credit to a financial institution thereby enabling said financial institution to pay said settlement to said client.

9. The method of claim 5 wherein said secondary entity takes a profit from any surplus of funds within said joint agreement account after any said settlement has been paid to said client.

10. The method of claim 4 wherein said amount and said maximum limit of said settlement is defined at a predetermined time interval prior to the sale of said commodity.

11. The method of claim 4 wherein said fee is paid prior to the sale of said commodity.

12. A method for guaranteeing a remuneration received by a feeder of cattle, comprising the steps of:

(a) obtaining by a company issuing said guarantee a probability and magnitude of losses that can be incurred, in a sale of said cattle, from a compilation and analysis of past cost to raise and sell the cattle, and sale data over a statistically significant interval of time;

(b) issuing a guarantee to said feeder prior to the sale of said cattle, wherein said guarantee agrees to pay a settlement to said feeder in an event that said feeder incurs a loss at the sale of said cattle;

(c) using said analysis of cost data in setting a value of said settlement; and (d) using said analysis of said data in setting a value of a fee to be paid by said feeder for said guarantee prior to the sale of said cattle.

13. The method of claim 12 including the additional step of forecasting a break even sale price for said cattle by said feeder at a predetermined time prior to the sale of said cattle.

14. The method of claim 13 further comprising the step of filing an application by said feeder for said guarantee, wherein said application contains said forecast.

15. The method of claim 14 wherein said application is received and evaluated by said company issuing said guarantees in order to include said break even forecast in the determination of said value of said fee.

16. A method for guaranteeing a remuneration received by a feeder of cattle, comprising the steps of:

(a) obtaining by a company issuing said guarantee a probability and magnitude of losses that can be incurred, in a sale of said cattle, from a compilation and analysis of past cost to raise and sell the cattle, and sale data over a statistically significant interval of time;

(b) issuing a guarantee to said feeder prior to the sale of said cattle, wherein said guarantee agrees to pay a settlement to said feeder in an event that said feeder incurs a loss at the sale of said cattle;

(c) using said analysis of cost data in setting a value of said settlement; and (d) using said analysis of cost data in setting a fee to be paid by said feeder for said guarantee prior to the sale of said cattlewherein (i) said fee is determined as a function of a break even cost of said cattle. and (ii) said settlement is solelv funded by a plurality of fees paid by a plurality of feeders.

17. The method of claim 12 wherein;

(a) said feeder files a claim with said company in an event a loss is incurred at the sale of said cattle;

(b) said claim is verified by said company; and (c) a financial institution is notified by said company to pay any said settlement due said feeder under terms of said guarantee.

18. The method of claim 12 wherein said maximum value of said settlement is defined as a percentage of said break even sale price.

* * * * *